United States Patent
Plantan et al.

(10) Patent No.: US 9,546,700 B2
(45) Date of Patent: Jan. 17, 2017

(54) SPRING BRAKE ACTUATOR AND METHOD FOR MAKING A SPRING BRAKE ACTUATOR

(71) Applicant: BENDIX COMMERCIAL VEHICLE SYSTEMS, LLC, Elyria, OH (US)

(72) Inventors: Ronald S. Plantan, Mooresville, NC (US); Eugene E. Clair, Berea, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 419 days.

(21) Appl. No.: 13/875,979

(22) Filed: May 2, 2013

(65) Prior Publication Data
US 2014/0326127 A1 Nov. 6, 2014

(51) Int. Cl.
| | |
|---|---|
| *F16D 49/00* | (2006.01) |
| *F16J 3/02* | (2006.01) |
| *F15B 15/10* | (2006.01) |
| *B60T 17/08* | (2006.01) |
| *F16D 121/08* | (2012.01) |

(52) U.S. Cl.
CPC ............. *F16D 49/00* (2013.01); *B60T 17/083* (2013.01); *B60T 17/088* (2013.01); *F15B 15/10* (2013.01); *F16J 3/02* (2013.01); *F16D 2121/08* (2013.01); *F16D 2250/0084* (2013.01)

(58) Field of Classification Search
CPC ........ F15B 15/10; F16D 49/00; B60T 17/083; F16J 3/02
USPC ........................................................ 92/98 R
See application file for complete search history.

(56) References Cited

U.S. PATENT DOCUMENTS

| | | | | |
|---|---|---|---|---|
| 1,064,714 | A * | 6/1913 | Deegan ...................... | F16J 3/02 236/26 C |
| 1,108,146 | A * | 8/1914 | Deegan ...................... | F16J 3/02 236/26 C |
| 2,687,908 | A * | 8/1954 | Vorech .................... | B60T 17/08 277/505 |
| 2,929,216 | A * | 3/1960 | Stelzer ........................... | 60/553 |

(Continued)

FOREIGN PATENT DOCUMENTS

| | | |
|---|---|---|
| DE | 10 2007 048 360 A1 | 4/2009 |
| GB | 445867 | 4/1936 |

(Continued)

OTHER PUBLICATIONS

Extended European Search Report dated Aug. 6, 2014 (eight (8) pages).

*Primary Examiner* — F. Daniel Lopez
*Assistant Examiner* — Richard Drake
(74) *Attorney, Agent, or Firm* — Crowell & Moring LLP

(57) ABSTRACT

A brake actuator is provided, in which a diaphragm, used in conjunction with a piston which compresses a parking brake-actuating spring, is arranged such that its outer peripheral region is captured between opposing housing flange portions such that a seal between the interior and exterior of the brake actuator housing is provided in a radially-oriented region of the diaphragm and the housing flange portions away from housing portion jointing components such as a clamp ring or individual fasteners. The diaphragm may also be provided with a wedge-shaped portion at its outer periphery which is axially oriented and configured to reside in a corresponding annular gap between the opposing housing flange portions.

8 Claims, 2 Drawing Sheets

(56) References Cited

U.S. PATENT DOCUMENTS

| | | | | |
|---|---|---|---|---|
| 4,157,146 A | * | 6/1979 | Svenson | F16J 13/06 |
| | | | | 220/324 |
| 5,163,355 A | | 11/1992 | Uyama | |
| 5,193,432 A | * | 3/1993 | Smith | B60T 17/083 |
| | | | | 403/338 |
| 5,259,292 A | | 11/1993 | Sunohara et al. | |
| 5,263,403 A | * | 11/1993 | Choinski et al. | 92/63 |
| 5,353,688 A | * | 10/1994 | Pierce | B60T 17/085 |
| | | | | 188/170 |
| 5,433,138 A | | 7/1995 | Choinski et al. | |
| 5,758,564 A | * | 6/1998 | Smith | B60T 17/083 |
| | | | | 92/98 R |
| 5,765,466 A | | 6/1998 | Plantan et al. | |
| 5,992,297 A | * | 11/1999 | Plantan et al. | 92/98 R |
| 6,401,958 B1 | * | 6/2002 | Foss | F16J 13/06 |
| | | | | 220/320 |
| 6,526,866 B2 | | 3/2003 | Pisoni et al. | |
| 6,536,329 B2 | | 3/2003 | Anderson et al. | |
| 6,705,651 B2 | * | 3/2004 | Heimann | E05B 17/08 |
| | | | | 292/204 |
| 2002/0144593 A1 | * | 10/2002 | Pisoni et al. | 92/98 R |

FOREIGN PATENT DOCUMENTS

| | | |
|---|---|---|
| GB | 1 521 657 | 8/1978 |
| WO | WO 01/81728 A1 | 11/2001 |

* cited by examiner

SPRING BRAKE ACTUATOR AND METHOD FOR MAKING A SPRING BRAKE ACTUATOR

BACKGROUND AND SUMMARY OF THE INVENTION

The invention relates to an actuator for a pneumatic brake system and a method for making such an actuator.

Vehicles, particularly commercial vehicles such as trucks and buses, typically have pneumatic braking systems. These pneumatic brake systems typically include an air-operated actuator for applying a disc brake or a drum brake at a wheel of the vehicle. A typical pneumatic actuator, referred to as a "spring brake actuator," includes a power spring which biases the actuator in a "brake applied" position when a parking brake function is desired or an emergency brake activation is needed when the service brake function is disabled. The power spring is compressed by compressed air in parking brake chamber to release the brake for normal service brake operation, with the spring being arranged to apply the brake when the compressed air is released in parking or emergency situations.

As illustrated in prior art FIG. 1, a typical pneumatic actuator 1 includes a housing 2 (also referred to as the cylinder), a spring pressure plate 3 (also referred to as the parking brake piston) moveably disposed in the housing, with a diaphragm 4 that is sealingly attached to the housing 2 and the spring pressure plate 3 to seal between the housing 2 and the spring pressure plate 3. The housing, spring pressure plate and diaphragm define a parking brake air chamber 5 for receiving compressed air to force the spring pressure plate 3 to compress the power spring 6, thereby releasing the parking brake. When the power spring 6 is compressed its actuator rod 7 no longer biases the service brake piston 8 and its actuator rod 9 toward the brake application position, thereby freeing the service brake piston 8 to be used to provide the service brake function of the spring brake actuator 1.

Typically, an outer flange 10 of the diaphragm 4 is captured between opposing flanges of the spring brake actuator housing, with the opposing flanges being held tightly together with a clamping ring 11 (for example, a separate clamping ring or a crimped-over flange of one portion of the housing). In the FIG. 1 illustration, the opposing flanges of the housing include the flange 12 of adapter base 13 and the flange 14 of the non-pressure plate (NPP) portion 15 of the housing 2.

FIG. 2 is a detailed partial cross-section view of the diaphragm capture arrangements of a known spring brake actuator, showing an outer flange 10 of diaphragm 4 having a wedge-shaped portion 16 captured between the housing opposing flanges 12, 14. In this embodiment, the opposing flanges are held together with a separate clamping ring 11.

A concern with such known diaphragm arrangements is leakage across the diaphragm's outer flange, for example, due to uneven compression from a clamp band used to hold flanges 12, 14 together, particularly at the clamp band's clamping bolt location. A further concern is that in some known spring brake actuators the wedge-shaped outer flange of the diaphragm has small sealing points in the region between the opposing flanges, which can cause sealing problems, as well as making difficult installation of a replacement diaphragm on a vehicle.

An objective of the present invention is to provide a diaphragm arrangement which addresses these and other problems by providing an improved seal having increased resistance to leakage across the sealing surface. The improved diaphragm seal arrangement is particularly well suited for use with parking brake actuators which have bolt-on NPP actuator housing portions.

The diaphragm of the present invention is a cup shaped diaphragm which includes two offset sections along its outer perimeter. The first offset section extends generally perpendicular to the central axis of the diaphragm. The second offset section extends generally parallel to the central axis of the diaphragm. The diaphragm may also include a wedge shape with a domed outer portion along the outer perimeter of the diaphragm.

These diaphragm features are configured to cooperate with matching annular spaces between the adapter base and the non-pressure plate of the actuator. The offset sections configuration improves the centering of the diaphragm in the actuator during the installation process (during both initial assembly and subsequent repair operations). The wedge portion may be provided to further enhance the diaphragm's resistance to being pulled out of space between the opposing flanges during in-service use. In one embodiment, the annular space between the actuator housing portions includes round surfaces to lower local stresses in the diaphragm material.

An embodiment uses at least two bolts along the external periphery of the brake actuator housing to hold the adapter base to the NPP housing portions together, eliminating a need for a clamping band. The entire annular area between the non-pressure plate and adapter base is filled by the diaphragm offset portions for an improved seal and all sealing takes place at this portion of the diaphragm once the bolts are installed, thereby eliminating any need to rely on the wedge portion of the outer circumference of the diaphragm to provide sealing or to ensure sealing is provided in the outer peripheral region around the housing closure bolts.

A further benefit of the present invention is that actuator replacement may be performed without the need to remove the NPP portion of the actuator from the vehicle.

Other objects, advantages and novel features of the present invention will become apparent from the following detailed description of the invention when considered in conjunction with the accompanying drawings.

DETAILED DESCRIPTION OF PREFERRED EMBODIMENTS

Figure 1:
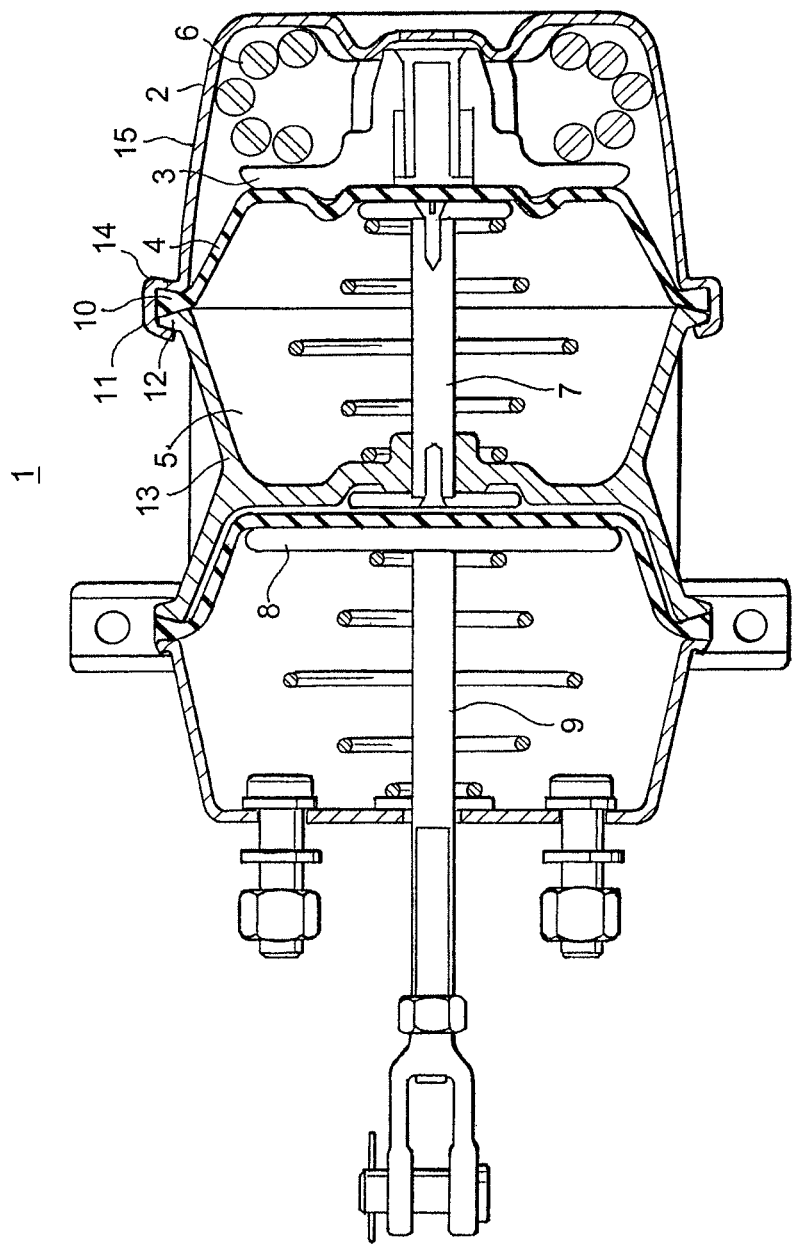
FIG. 1 is a partial cross-section view of a known spring brake actuator configuration.
Figure 3:
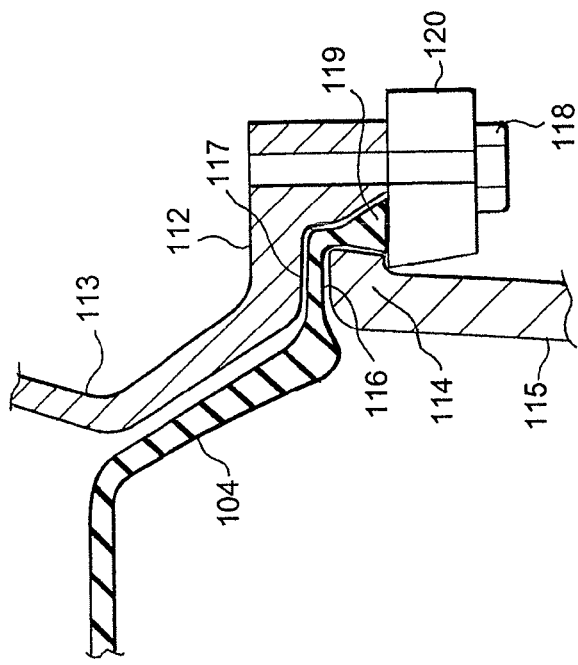
FIG. 3 is a detailed partial cross-section view of a diaphragm sealing arrangement in accordance with an embodiment of the present invention.

FIG. 3 shows a detailed cross-section view of an embodiment of the diaphragm sealing arrangement of the present invention. In this embodiment, the diaphragm 104 is captured within an annular space between the opposing housing flanges 112, 114 of adapter base 113 and NPP portion 115, respectively, with the housing flanges 112, 114 held together by one or more (preferably two or more) fasteners 118 at an outer peripheral region of the housing.

Primary sealing in this embodiment occurs in the region of the axially-opposed sealing surfaces 116, 117 of housing flanges 112, 114. Because there is no clamp or fastening device in the region in which the diaphragm seals against the housing portions in this embodiment, a more uniform and reliable seal is provided.

FIG. 3 also illustrates an advantageous arrangement of the outer periphery 119 of the diaphragm 104. In this embodiment, the outer periphery 119 has a "double dog leg" shape, with a radial portion captured between axially-opposed sealing surfaces 116, 117, an axial portion captured between opposing radially-outer and radially-inner surfaces, respectively of the housing flanges 112, 114, and an wedge-shaped portion having increased thickness in the radial direction in the annular region between the adapter base and NPP, i.e., between the housing flanges' radially-outer and radially-inner surfaces and a wedge-facing surface of a spacer or clamp ring 120 through which fasteners 118 pass. In addition to the inventive seal arrangements providing increased uniformity in seal compression and sealing surface area, the wedge portion of the diaphragm provides significantly improved resistance to the wedge region's portion of the seal being pulled out of the annular space between the adapter base and non-pressure plate.

Figure 4:
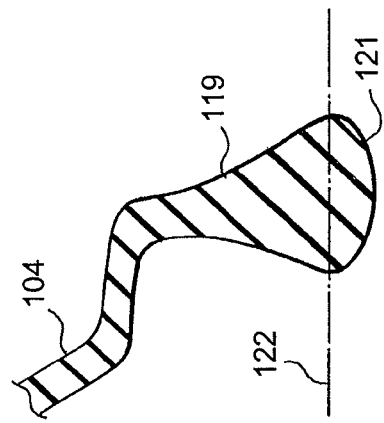
FIG. 4 is a detailed partial cross-section view of an end region of a diaphragm sealing arrangement in accordance with another embodiment of the present invention.
Figure 2:
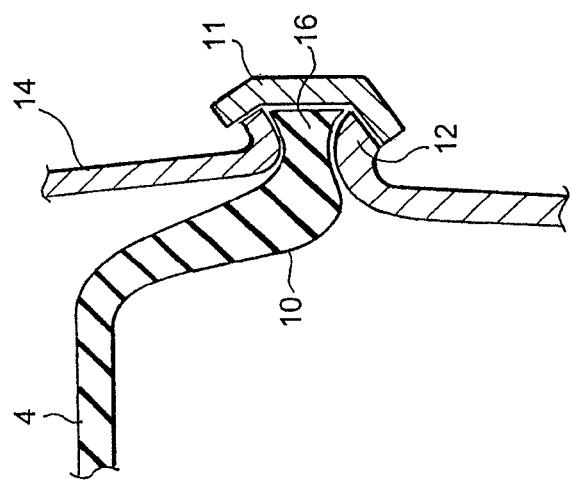
FIG. 2 is a detailed partial cross-section view of a known parking brake diaphragm arrangement.

As shown in the FIG. 4 cross-section view of an end region of another embodiment of the diaphragm 104, the wedge-shaped portion 119 may be formed slightly oversized in one or more dimensions in order to increase the compression loading on this portion of the diaphragm and further enhance its resistance to being pulled out of the annular gap. For example, the outer-most portion 121 of the wedge portion 119 may be provided with a somewhat rounded face which in the uncompressed state extends beyond the expected wall face against which it seals (represented in FIG. 4 by the broken line 122). The radially-inward-facing and radially-outward-facing surfaces of wedge portion 119 may similarly be formed oversized in the uncompressed state, either without corresponding oversized faces on the other surfaces of wedge portion 119.

The diaphragm 104 is preferably formed from an elastic material, such as rubber, however, any material which provides the required flexibility, sealing and resistance to failure (such as by tearing or otherwise rupturing) for use as a spring brake diaphragm may be used.

The present invention is not limited to the particular embodiment shown in FIG. 3, as long as the improved sealing arrangements and increased pull-out resistance from the present invention's multiple-direction outer peripheral diaphragm region are maintained. The diaphragm sealing arrangements of the present invention also are not solely limited to parking brake actuator applications. For example, similar arrangements may be used to secure and seal a diaphragm for a service brake piston to a service brake portion of the actuator housing, or the coupling device holding the first and second housing portions together may be a crimped flange, rivet or other suitable attachment approach other than a clamping ring or fasteners such as bolts.

Further, the portion of the annular gap in FIG. 3 laying in a plane perpendicular to the longitudinal axis of the (i.e., in regions 116, 117) need not be arranged exactly within the perpendicular plane, but may instead be arranged at a non-perpendicular angle relative to the longitudinal axis, as long as the sealing region in the radially-inner peripheral region of the diaphragm is not compromised by clamping rings or other fasteners. Similarly, the outer peripheral region of the diaphragm in the axially-oriented portion of the annular gap need not lay exactly parallel to the longitudinal axis of the actuator housing, but may be arranged along an axis which is not parallel to the housing longitudinal axis as long as the diaphragm-retaining portion of the outer peripheral region of the diaphragm is not susceptible to being pulled through the radially-inner portion of the annular gap.

The present invention further provides an improved method for brake actuator assembly, particularly during service work performed in the field, such as in a commercial vehicle repair facility. Typically, spring brake actuators are located in highly space-constrained locations under a vehicle, such as under a tractor or a trailer. Replacing a spring brake diaphragm in such confined spaces may be difficult, particularly when the spring brake actuator is oriented at a significant angle away from vertical or when visibility of the relevant portions of actuator is limited. In such cases, prior art diaphragms with essentially planar arrangements had the significant problem of requiring the technician to simultaneous align the outer portion of the planar diaphragm on one side of a housing flange, locate and hold an opposite housing flange over the diaphragm, and installing and tightening housing retaining features while trying to maintain the position of the diaphragm so that its outer peripheral region did not slip out from between the opposing flanges of the housing portions.

In contrast, in the present invention the diaphragm may be laid across the piston chamber of the disassembled actuator and once its approximately perpendicular peripheral portions are lightly pressed into place over the first housing portion's flange, no further diaphragm alignment control is needed. Because the present invention's diaphragm is thus self-locating and self-retaining, the technician is freed from the need to simultaneously manipulate and locate multiple components, and may simply locate the opposing second portion of the housing over the diaphragm and the flange of the first housing portion, and then install the housing coupling components (e.g., clamp ring and/or fasteners such as bolts) to complete the actuator assembly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An actuator for a brake system, comprising:
    an actuator housing having a first housing portion and a second housing portion defining a piston chamber therein;
    a piston moveably disposed in the piston chamber;
    a diaphragm extending between the housing and the piston to define sub-chambers on opposing sides of the piston; and
    at least one clamping device and at least one fastener couple the first housing portion and the second housing portion with the diaphragm therebetween,
    wherein
        the first housing portion has a first flange portion configured to cooperate with a second flange portion of the second housing portion to define an annular gap therebetween,
        the first flange portion extends radially outward beyond a radially-outer surface of a second flange portion of the second housing portion, the first flange portion includes at least one axially-oriented fastener receiving feature located radially outward from the radially-outer surface of the second flange portion, the annular gap includes a radially-inner region aligned in a plane approximately perpendicular to a longitudinal axis of the actuator housing in which a radially-inner peripheral region of the diaphragm is sealingly located between the first flange portion and the second flange portion, the annular gap includes a radially-outer region aligned approximately parallel to the longitudinal axis of the actuator housing in which a radially-outer peripheral region of the diaphragm is located between the first flange portion and the second flange portion, the at least one clamping device is arranged on a second housing portion side of the first flange portion such that:

the at least one clamping device is radially aligned with the first flange portion at a location at which the at least one fastener is received by the at least one fastener receiving feature to axially fix the at least one clamping device to the first flange portion, the at least one clamping device is located axially away from the annular gap on a second flange portion side of the annular gap, the at least one clamping device cooperates with the first flange portion to capture the second flange portion and a radially-outer peripheral region of the diaphragm therebetween, and at least a portion of the radially-outer peripheral region of the diaphragm not axially supported by the second flange portion is axially supported between the at least one clamping device and the first flange portion.

2. The actuator of claim 1, wherein at least a portion of the radially-outer peripheral portion of the diaphragm and a corresponding portion of the annular gap are wedge-shaped.

3. The actuator of claim 2, wherein the diaphragm is formed with the radially-outer peripheral region of the diaphragm aligned approximately perpendicular to the radially-inner peripheral region of the diaphragm.

4. The actuator of claim 2, wherein the wedge-shaped portion of the radially-outer peripheral region of the diaphragm is formed with at least one circumferential surface which is larger than a corresponding surface of the wedge-shaped portion of the radially-outer region of the annular gap, and the at least one larger circumferential surface is compressed to conform to the corresponding surface of the wedge-shaped portion of the radially-outer region of the annular gap when the diaphragm is in an installed position in the actuator housing.

5. A method of assembling a brake actuator, comprising the acts of:

locating a diaphragm on a first flange portion of a first housing portion of an actuator housing;

locating a second flange portion of a second housing portion of the actuator housing on the diaphragm such that a peripheral region of the diaphragm is located in an annular gap between the first flange portion and the second flange portion; and coupling the first housing portion to the second housing portion such that the diaphragm is sealingly located between the first flange portion and the second flange portion, wherein the first flange portion extends radially outward beyond a radially-outer surface of a second flange portion of the second housing portion, the first flange portion includes at least one axially-aligned fastener receiving feature located radially outward from the radially-outer surface of the second flange portion, the annular gap includes a radially-inner region aligned in a plane approximately perpendicular to a longitudinal axis of the actuator housing in which a radially-inner region of peripheral region of the diaphragm is located between the first flange portion and the second flange portion, the annular gap includes a radially-outer region aligned approximately parallel to the longitudinal axis of the actuator housing in which a radially-outer region of the peripheral region of the diaphragm is located between the first flange portion and the second flange portion, the coupling act is performed with at least one clamping device is arranged on a second housing portion side of the first flange portion such that:

the at least one clamping device is radially aligned with the first flange portion at a location at which the at least one fastener is received by the at least one fastener receiving feature to axially fix the at least one clamping device to the first flange portion, the at least one clamping device is located axially away from the annular gap on a second flange portion side of the annular gap, the at least one clamping device cooperates with the first flange portion to capture the second flange portion and a radially-outer peripheral region of the diaphragm therebetween, and at least a portion of the radially-outer peripheral region of the diaphragm not axially supported by the second flange portion is axially supported between the at least one clamping device and the first flange portion.

6. The method of claim 5, wherein at least a portion of the radially-outer portion of the peripheral region of the diaphragm and a corresponding portion of the annular gap are wedge-shaped.

7. The method of claim 6, wherein the diaphragm is formed with the radially-outer peripheral region of the diaphragm aligned approximately perpendicular to the radially-inner peripheral region of the diaphragm.

8. The method of claim 6, wherein the wedge-shaped portion of the radially-outer peripheral region of the diaphragm is formed with at least one circumferential surface which is larger than a corresponding surface of the wedge-shaped portion of the radially-outer region of the annular gap, and the at least one larger circumferential surface is compressed to conform to the corresponding surface of the wedge-shaped portion of the radially-outer region of the annular gap when the diaphragm is in an installed position in the actuator housing.

* * * * *